United States Patent [19]

Inagaki et al.

[11] Patent Number: 4,830,132
[45] Date of Patent: May 16, 1989

[54] FOUR WHEEL DRIVE POWER TRANSMISSION SYSTEM SKIDDING CONTROL DEVICE AND METHOD

[75] Inventors: Takafumi Inagaki; Kazumasa Nakamura, both of Toyota, Japan

[73] Assignee: Toyota Jidosha Kabushiki Kaisha, Toyota, Japan

[21] Appl. No.: 918,082

[22] Filed: Oct. 14, 1986

[30] Foreign Application Priority Data

Oct. 14, 1985 [JP] Japan ................................ 60-228073
Oct. 14, 1985 [JP] Japan ................................ 60-228074

[51] Int. Cl.$^4$ ............................................. B60K 17/34
[52] U.S. Cl. ................................... 180/197; 180/249; 364/424.1
[58] Field of Search ............... 180/197, 247, 248, 249, 180/250; 364/424.1

[56] References Cited

U.S. PATENT DOCUMENTS

| | | | |
|---|---|---|---|
| 4,298,085 | 11/1981 | Moroto et al. | 180/247 |
| 4,484,653 | 11/1984 | Horikoshi | 180/197 X |
| 4,552,241 | 11/1985 | Suzuki | 180/197 X |
| 4,558,414 | 12/1985 | Sakakiyama | 180/197 X |
| 4,562,541 | 12/1985 | Sakakiyama | 180/197 X |
| 4,671,373 | 6/1987 | Sigl | 180/197 |
| 4,682,667 | 7/1987 | Hosaka | 180/197 |

FOREIGN PATENT DOCUMENTS

| | | |
|---|---|---|
| 57-44534 | 3/1982 | Japan ................................ 180/197 |
| 60-5908 | 9/1985 | Japan . |
| 60-5909 | 9/1985 | Japan . |

Primary Examiner—David M. Mitchell
Attorney, Agent, or Firm—Oblon, Fisher, Spivak, McClelland & Maier

[57] ABSTRACT

In a four wheel drive vehicle having a central power distribution device for transmitting engine power to a combination of left and right front wheels and a combination of left and right rear wheels with an action of differentiating rotation between the combination of the left and right front wheels and the combination of the left and right rear wheels, a skidding control device locks up the rotation differentiating action of the central power distribution device when at least either a difference between the rotation of the left front wheel and the rotation of the right front wheel or a difference between the mean rotation of the left front wheel and the right front wheel and the rotation of the combination of the left and right rear wheels exceeds a limit value predetermined therefor.

3 Claims, 9 Drawing Sheets

FOUR WHEEL DRIVE POWER TRANSMISSION SYSTEM SKIDDING CONTROL DEVICE AND METHOD

BACKGROUND OF THE INVENTION

The present invention relates to a skidding control method and device for a four wheel drive power transmission system, and more particularly relates to such a skidding control method and device for such a four wheel drive power transmission system for a vehicle such as an automobile adapted for four wheel drive operation, particularly adapted to control a differential device which is provided for distributing power between the front wheels of the vehicle and the rear wheels of the vehicle, in which the construction and operation thereof are improved so as to improve the quality of anti skidding control and thereby improve vehicle drivability.

The present invention has been described in Japanese Patent Applications Ser. Nos. 60-228073 and 60-228074 (1985), filed by an applicant the same as the entity assigned or owed duty of assignment of the present patent application; and the present patent application hereby incorporates into itself by reference the text of said Japanese Patent Applications and the claims and the drawings thereof; copies are appended to the present application.

Nowadays a greatly increasing number of automotive vehicles are being constructed with four wheel drive transmission systems, because such four wheel drive operation, in which all four wheels of the vehicle are powered from its engine via its transmission, is very suitable for driving on poor or slippery road surfaces such as in mud or over bad ground, or upon roads covered with mud, snow, ice, or rain. In other words, four wheel drive operation provides a much higher degree of stability and drivability for the vehicle in conditions where the coefficient of friction between the wheels and the surface upon which the vehicle is riding is relatively low. Also, four wheel drive operation is beneficial for aiding with hill climbing characteristics and high speed stability characteristics.

In a four wheel drive transmission system for such an automotive vehicle, it is usual to provide a differential device for distributing rotational power between the front wheels of the vehicle and the rear wheels of the vehicle, as well as the per se conventional rear differential device that provides differential action between the two rear vehicle wheels and the also per se conventional front differential device that provides differential action between the two front vehicle wheels. Such a front-rear differential device is provided in order to provide a differential action between said front vehicle wheels (considered as a pair) and said rear vehicle wheels (also considered as a pair) when the vehicle is turning around a curve. However, a problem that arises with the provision of such a front-rear differential device is that, if one of the four vehicle wheels should break away from the road surface and should start to spin, then no drive is provided to the other three vehicle wheels.

In order to counter this effect, it has been practiced to provide a device to such a front-rear differential device which prevents said front-rear differential device from performing differential action, in a selective fashion. When such a differential action inhibition means is actuated, it causes the differential action provided by said front-rear differential device between the front vehicle wheels and the rear vehicle wheels to be prevented, and instead said front vehicle wheels, considered as a pair, are driven from the vehicle engine, and also said rear vehicle wheels, considered as a pair, are independently driven from said engine. Thereby, the problem outlined above, of loss of power to the other vehicle wheels when one of the vehicle wheels starts to spin, is obviated.

Further, when driving upon a road surface with a low coefficient of friction in such a four wheel drive vehicle, the effect of such a front-rear differential device is that the various vehicle wheels can skid independently. In order to counter this, in Japanese Utility Model Application Laying Open Publication Ser. No. 59-155225 (1984), which it is not intended hereby to admit as prior art to the present patent application except to the extent in any case required by applicable law, there is disclosed the concept of, when the coefficient of friction between the steered wheels (the front wheels) and the road surface is less than a determinate value, and also the rear differential itself is not locked, displaying an indication instructing the vehicle driver to lock the front-rear differential device so as to suppress its differential effect.

However, the following problems arise with such a concept.

First, when driving upon a road surface with a low coefficient of friction in such a four wheel drive vehicle, even though an indication instructing the vehicle driver to lock the front-rear differential device so as to suppress its differential effect may be displayed, the actual locking of said front-rear differential device must be manually performed by the vehicle driver according to his or her own judgement and decision. Unfortunately, it is precisely upon this sort of road surface that the attention of the vehicle driver is preempted by more pressing problems of vehicle control, since the driving and braking stability of the vehicle are deteriorated according to reduction of the road surface coefficient of friction and accordingly operation of the vehicle is more difficult, and thus the added burden on said driver of monitoring and responding to such a differential device locking indication is unrealistic and unreasonable.

Second, since in such a proposal as outlined above only the coefficient of friction between the steered vehicle wheels, i.e. the front wheels, and the road surface is monitored, in the event that it should be the rear wheels of the vehicle which skid first, no proper locking ordering for the front-rear differential device is performed.

Another important consideration in this connection is that it is important to release the locking of the front-rear differential device as soon as appropriate, because, if said front-rear differential device is maintained as locked over an extensive time period, then the inevitable differences in the rotational speeds between the front wheels and the rear wheels are not absorbed, and undue tire wear and transmission wear are caused, and further the vehicle performance and fuel economy are deteriorated. On the other hand, said locking of the front-rear differential device should of course not be released before such release is in fact appropriate, i.e. if skidding of any vehicle wheel is continuing.

SUMMARY OF THE INVENTION

The inventors of the present invention have considered the various problems detailed above in the aforementioned type of skidding control method and device for a four wheel drive type vehicle, from the point of view of the desirability of minimizing the skidding of the vehicle by locking up the front-rear differential device, while still not performing such locking up more than actually necessary.

Accordingly, it is the primary object of the present invention to provide an improved skidding control method for a four wheel drive type vehicle, and a corresponding device for implementing said method, of the general type described above, which avoid the problems detailed above.

It is a further object of the present invention to provide such a skidding control method and device, which do not entail locking up the front-rear differential device longer than necessary.

It is a further object of the present invention to provide such a skidding control method and device, which do not entail releasing the locking up the front-rear differential device earlier than appropriate.

It is a further object of the present invention to provide such a skidding control method and device, which function properly even if it is the rear wheels of the vehicle which skid first before the front wheels.

It is a further object of the present invention to provide such a skidding control method and device, which function properly whichever of the wheels of the vehicle it be which skids.

It is a yet further object of the present invention to provide such a skidding control method and device, which minimize the control effort required from the vehicle driver.

It is a yet further object of the present invention to provide such a skidding control method and device, which maximize transmission service life and reliability.

It is a yet further object of the present invention to provide such a skidding control method and device, which minimize tire wear.

It is a yet further object of the present invention to provide such a skidding control method and device, which maximize vehicle fuel economy.

According to the most general method aspect of the present invention, these and other objects are attained by, for a four wheel drive power transmission system for a vehicle with two front wheels, two rear wheels, and an engine, comprising a power distribution device for four wheel drive, which receives rotational power from said engine and provides said rotational power to the combination of the front wheels of said vehicle and also to the combination of the rear wheels of said vehicle, said power distribution device for four wheel drive being controllable either to provide differential action between said combination of said front wheels of said vehicle and said combination of said rear wheels of said vehicle, or not: a skidding control method, wherein: (a) the rotation state of said combination of said front wheels of said vehicle is detected; (b) the rotation state of said combination of said rear wheels of said vehicle is detected; (c) a decision is made as to whether or not said front wheels of said vehicle or said rear wheels of said vehicle are skidding, based upon the rotation state of said front wheels and the rotation state of said rear wheels; and: (d) said power distribution device for four wheel drive is controlled to start not providing its differential function if said decision has determined that said front wheels of said vehicle or said rear wheels of said vehicle are skidding, and is controlled to, after a certain time period has elapsed after said decision has determined that said front wheels of said vehicle and said rear wheels of said vehicle are not skidding, start controlling said power distribution device for four wheel drive to start providing its differential function; or, alternatively, for a four wheel drive power transmission system for a vehicle with two front wheels, two rear wheels, and an engine, comprising a power distribution device for four wheel drive, which receives rotational power from said engine and provides said rotational power to the combination of the front wheels of said vehicle and also to the combination of the rear wheels of said vehicle, said power distribution device for four wheel drive being controllable either to provide differential action between said combination of said front wheels of said vehicle and said combination of said rear wheels of said vehicle, or not: a skidding control method, wherein: (a) the rotation state of said combination of said front wheels of said vehicle is detected; (b) the rotation state of said combination of said rear wheels of said vehicle is detected; (c) a decision is made as to whether or not said front wheels of said vehicle or said rear wheels of said vehicle are skidding, based upon said detected front wheels rotation state and said detected rear wheels rotation state; (d) a value representative of the road speed of the vehicle is detected and a signal representative thereof is produced; (e) a value representative of the load on said vehicle engine is detected and a signal representative thereof is produced; (f) a decision is made as to whether or not a normal vehicle running condition is currently prevailing, based upon the detected values for vehicle speed and engine load; and: (g) said power distribution device for four wheel drive is controlled to start not providing its differential function if said skidding decision determines that said front wheels of said vehicle or said rear wheels of said vehicle are skidding, and, when said normal vehicle running condition decision determines that a normal vehicle running condition is currently prevailing, said power distribution device for four wheel drive is controlled to start providing its differential function; and, according to the most general device aspect of the present invention, these and other objects are attained by, for a four wheel drive power transmission system for a vehicle with two front wheels, two rear wheels, and an engine, comprising a power distribution device for four wheel drive, which receives rotation power from said engine and provides said rotational power to the combination of the front wheels of said vehicle and also to the combination of the rear wheels of said vehicle, said power distribution device for four wheel drive being controllable either to provide differential action between said combination of said front wheels of said vehicle and said combination of said rear wheels of said vehicle, or not: a skidding control device, comprising: (a) a means for detecting the rotation state of said combination of said front wheels of said vehicle; (b) a means for detecting the rotation state of said combination of said rear wheels of said vehicle; (c) a means for making a decision as to whether or not said front wheels of said vehicle or said rear wheels of said vehicle are skidding, based upon the output of said front wheels rotation state detecting means and said rear wheels rotation state detecting means; and: (d) a means for controlling said power distribution device for four wheel drive to start not providing its differential function if said skidding decision means determines that said front wheels of said vehicle or said rear wheels of said vehicle are skidding, and for, after a certain time period has elapsed after said skidding decision means determines that said front wheels of said vehicle and said rear wheels of said vehicle are not skidding, controlling said power distribution device for four wheel drive to start providing its differential function; or, alternatively, by, for a four wheel drive power transmission system for a vehicle with two front wheels, two rear wheels, and an engine, comprising a power distribution device for four wheel drive, which receives rotational power from said engine and provides said rotational power to the combination of the front wheels of said vehicle and also to the combination of the rear wheels of said vehicle, said power distribution device for four wheel drive being controllable either to provide differential action between said combination of said front wheels of said vehicle and said combination of said rear wheels of said vehicle, or not; a skidding control device, comprising: (a) a means for detecting the rotation state of said combination of said front wheels of said vehicle; (b) a means for detecting the rotation state of said combination of said rear wheels of said vehicle; (c) a means for making a decision as to whether or not said front wheels of said vehicle or said rear wheels of said vehicle are skidding, based upon the output of said front wheels rotation state detecting means and said rear wheels rotation state detecting means; (d) a means for detecting a value representative of the road speed of the vehicle and for producing a signal representative thereof; (e) a means for detecting a value representative of the load on said vehicle engine and for producing a signal representative thereof; (f) a means for making a decision as to whether or not a normal vehicle running condition is currently prevailing, based upon the signals from said vehicle speed detection means and said engine load detection means; and: (g) a means for controlling said power distribution device for four wheel drive to start not providing its differential function if said skidding decision means determines that said front wheels of said vehicle or said rear wheels of said vehicle are skidding, and for, when said normal vehicle running condition decision means determines that a normal vehicle running condition is currently prevailing, controlling said power distribution device for four wheel drive to start providing its differential function.

The first such skidding control method and device, as specified above, are illustrated in FIG. 1 of the accompanying drawings in a schematic block diagrammatical manner. Referring to this figure, the differential means M1 receives a command from the outside to either provide differential action between the front vehicle wheels and the rear vehicle wheels, or not. For example, this differential means M1 may comprise a pair of small beveled pinions, a pair of large beveled pinions, and a multi plate clutch which directly couples together its two output shafts, plus drive devices therefor. Alternatively, said differential means M1 may include a planetary gear train and a clutch which provides direct coupling together of a pair selected from the sun gear, the carrier, and the ring gear of said planetary gear train, plus drive devices therefor. The front wheels rotation state detecting means M2 detects the rotation state of the front wheels of the vehicle, and similarly the rear wheels rotation state detecting means M2 detects the rotation state of the front wheels of the vehicle.

Here the expression "rotation state" can mean the rotational velocities of said wheels, or their rotational accelerations, or maybe their angular positions. Such front and rear wheels rotation state detecting means M2 and M3 may, for example, be electromagnetic pickups or proximity switches, or may be semiconductor type Hall sensors or the like, mounted close to the shaft of their respective wheels. Or again combinations of optical sensors and grid disks on the vehicle wheel shafts or shafts coupled thereto could be utilized. The skidding decision means M4 determines from the rotation state of the front wheels of the vehicle and the rotation state of the rear wheels of the vehicle whether or not skidding is currently occurring. For example, if the rotational speed difference between the front wheels and the rear wheels exceeds a certain determinate value, then this could be taken as evidence of skidding. Similarly, if the rotational speed difference between the left and right front wheels exceeds a certain determinate value, then this could also be taken as evidence of skidding. Other possibilities also exist; for example, from the rotational speeds of the wheels and from the known road speed of the vehicle (if a sensor therefor be available), it is possible to make a decision as to whether or not skidding is occurring. And, finally, the differential control means M5 stops the differential M1 from providing its differential effect when skidding state is detected, and also starts said differential M1 providing its differential effect again, when a certain time period has elapsed after last determining the skidding state. Thus, said differential control means M5 sends signals to said differential M1 for implementing this function. If, before this time has elapsed, skidding is again detected, then the timing of the time interval may be restarted at this time point. Here the time interval may be set as suitable for a relatively slippery road surface. Alternatively, it would be possible to form an estimation of the coefficient of friction of the road surface according to the vehicle driving force and the rotational acceleration of the vehicle driven wheels, and to determine according to this a value for said road surface coefficient of friction. Alternatively, a sensor for directly sensing said road surface coefficient of friction may be provided on the vehicle. Yet further alternatively, said road surface coefficient of friction may be determined according to the difference of the rotation speeds between the front and the rear vehicle wheels. And the devices M4 and M5 may be discretely constructed logical processing circuits, which would provide a hardware type implementation for said devices M4 and M5. Or, alternatively, said devices M4 and M5 may be embodied in micro computer form, incorporating a CPU (central processing unit), RAM (random access memory), ROM (read only memory), and the like, with a program or programs being stored in said ROM. This would provide a software type implementation for said devices M4 and M5.

And the second such skidding control method and device, as specified above, are illustrated in FIG. 7 of the accompanying drawings, also in a schematic block diagrammatical manner similar to FIG. 1. Referring to this FIG. 7, in addition to the FIG. 1 elements, there are provided the vehicle speed detection means M6 and the engine load detection means M7, which respectively detect a value representative of the vehicle speed and a value representative of the load on the vehicle engine. The vehicle speed detection means M6 may, for example, include a sensor which measures the angle of a drive shaft for one or more of the vehicle wheels at intervals and which bases its output signal on the results of such observation. And the engine load detection means M7 may, for example, include a number of contacts of a throttle position sensor for the throttle of the internal combustion engine of the vehicle. Further and finally, there is included a normal running decision means M8, which can, for example, determine a normal vehicle running condition in the case that the change in the load on the vehicle engine detected by said engine load detection means over a certain throttle opening decision time interval is less than a first determinate value and also the change in the vehicle road speed detected by said vehicle speed detection means over a certain road speed decision time interval is less than a second determinate value. In this case, the differential control means M5 stops the differential effect of the differential device M1 when the skidding state is determined, but starts said differential effect of the differential device M1 again when the normal vehicle running condition is detected.

Further, according to a particular specialization of the method aspect of the present invention, the above specified and other objects are more particularly attained by a skidding control method as first described above, wherein if, after said decision has first determined that said front wheels of said vehicle and said rear wheels of said vehicle are not skidding but before said certain time period has elapsed, said decision again determines that said front wheels of said vehicle or said rear wheels of said vehicle are skidding, the timing of said time period is restarted. On the other hand, according to another particular specialization of the method aspect of the present invention, the above specified and other objects are more particularly attained by a skidding control method as secondly described above, wherein said normal vehicle running condition decision determines a normal vehicle running condition in the case that the change in the detected load on the vehicle engine over a certain throttle opening decision time interval is less than a first determinate value and also the change in the detected vehicle road speed over a certain road speed decision time interval is less than a second determinate value.

Yet further, according to a particular specialization of the device aspect of the present invention, the above specified and other objects are more particularly attained by a skidding control device as first described above, wherein said power distribution device control means is for, if after said skidding decision means has first determined that said front wheels of said vehicle and said rear wheels of said vehicle are not skidding but before said certain time period has elapsed, said skidding decision means again determines that said front wheels of said vehicle or said rear wheels of said vehicle are skidding, restarting the timing of said time period. On the other hand, according to another particular specialization of the device aspect of the present invention, the above specified and other objects are more particularly attained by a skidding control device as secondly described above, wherein said normal vehicle running condition decision means is for determining a normal vehicle running condition in the case that the change in the load on the vehicle engine detected by said engine load detection means over a certain throttle opening decision time interval is less than a first determinate value and also the change in the vehicle road speed detected by said vehicle speed detection means over a certain road speed decision time interval is less than a second determinate value.

Thus, according to these various methods and devices, when the skidding state is determined by the means M4 according to the outputs of the means M2 and M3, the differential action of the differential device M1 is stopped; and in the first case when a certain time period has elapsed after skidding has stopped the device M5 causes the differential action of the differential device M1 to be restarted, while in the second case when the means M8 according to the outputs of the means M2 and M7 determines upon a normal vehicle running condition the device M5 causes the differential action of the differential device M1 to be restarted. Thus, in the first of these two cases, in the skidding state the differential action between the front and the rear vehicle wheels is eliminated, and this condition is maintained until it is predicted that the skidding condition will have disappeared; but, in the second of these two cases, in the skidding state the differential action between the front and the rear vehicle wheels is eliminated, and this condition is maintained until the decision is made that the vehicle operation is normal, based upon changes in the vehicle speed and changes in the vehicle throttle opening. Thus, in either case, skidding control is started automatically when it is decided that skidding is occurring, without requiring particular action by the vehicle driver, and said skidding control is likewise terminated automatically.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures; and:

DESCRIPTION OF THE PREFERRED EMBODIMENTS

The present invention will now be described with reference to the preferred embodiments thereof, and with reference to the figures.

OVERALL VEHICLE POWER TRAIN STRUCTURE

Figure 2:
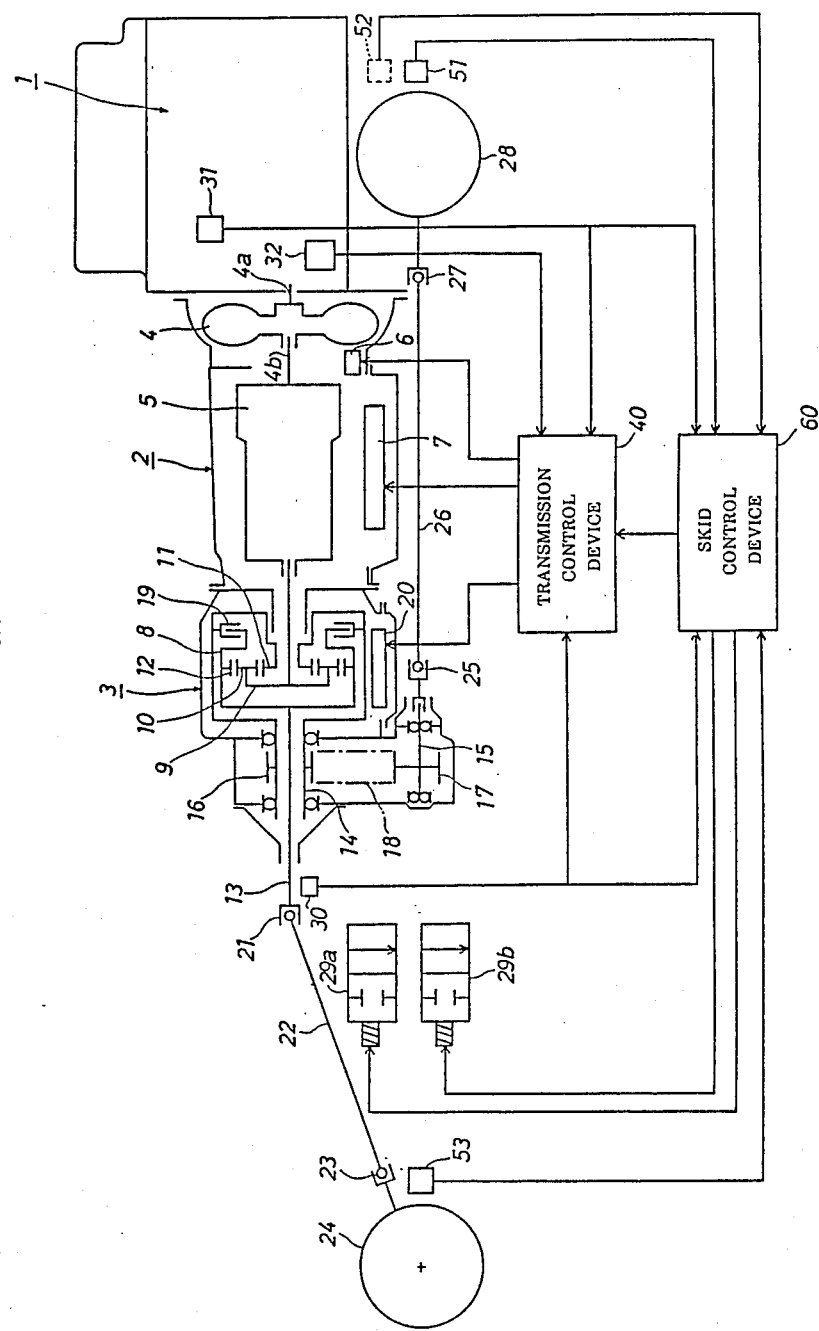
FIG. 2 is a longitudinal skeleton view of a vehicle power train which incorporates either of the preferred embodiments of the skidding control device of the present invention, for practicing the respective preferred method embodiments.

FIG. 2 is a longitudinal skeleton view of a vehicle power train which incorporates any one of the preferred embodiments of the four wheel drive power transmission system anti skid device of the present invention, said device performing a corresponding method embodiment. In this figure, the reference numeral 1 denotes an internal combustion engine of said vehicle, which is mounted, in this exemplary case, longitudinally in the front engine room (not particularly shown) of said vehicle. And the reference numeral 2 denotes an automatic speed change device (automatic transmission) of a per se known type, while 3 denotes a four wheel drive power transfer device.

In more detail, the automatic speed change device 2 incorporates a fluid torque converter 4 of a per se known construction, incorporating a lock up clutch (not particularly shown) controlled by a lock up clutch control solenoid 6, and the power input shaft 4a of this fluid torque converter 4 is connected to and receives rotational power from a crank shaft (not shown either of the internal combustion engine 1. And the fluid torque converter 5 is housed within a torque converter housing fitted against and secured to the main body of the internal combustion engine 1, while the automatic speed change device 2 comprises a gear transmission mechanism 5, which is likewise housed within a speed change device housing fitted against and secured to the torque converter housing. And the input shaft (not particularly shown) of the gear transmission mechanism 5 is connected to and receives rotational power from the power output shaft 4b of the fluid torque converter 4; and thereby the gear transmission mechanism 5 receives rotational power from the internal combustion engine 1, with a certain degree of slippage and also torque amplification being provided for said rotational power by the fluid torque converter 4 (unless the lock up clutch is activated) as is per se conventional. This gear transmission mechanism 5 may for the purposes of this specification be of a per se known type incorporating various planetary gear mechanisms and friction engaging mechanisms such as clutches and brakes, and according to selective actuation of said friction engaging mechanisms, provided by an electrical/hydraulic control mechanism 7 of a per se known sort including various speed change solenoids and so on, provides any one of a plurality of speed reduction stages between its said power input shaft and its power output shaft, its said power output shaft driving the four wheel drive power transfer device 3.

This four wheel drive power transfer device 3 incorporates a central differential device 8 of a planetary gear wheel type for providing differential action between the front wheels of the vehicle and the rear wheels of the vehicle during four wheel drive operation. Now the detailed construction of this central differential device 8 will be explained. It comprises a sun gear 11, a ring gear 12, a carrier 9, and a plurality of planetary pinions 10 rotatably mounted to said carrier 9 and meshed between the sun gear 11 and the ring gear 12 and performing planetary movement between them in a per se known manner. The carrier 9 functions an an input member for this central differential device 8, and is rotationally connected to the output shaft of the gear transmission mechanism 5 via a shaft which passes through the central axis of the hollow sun gear 11. The ring gear 12 functions as one power output member for the central differential device 8 for supplying power to the rear wheels of the vehicle, and is rotationally connected to a rear wheel power output shaft 13 which extends out of the four wheel drive power transfer device 3 in the direction to the left as seen in FIG. 2, i.e. towards the rear of the vehicle in this particular exemplary implementation. And the sun gear 11 functions as another power output member for the central differential device 8 for supplying power to the front wheels of the vehicle, and is rotationally connected to a sleeve shaped intermediate front wheel drive shaft 16 via a drum member fitted around the planetary gear mechanism as a whole. This intermediate front wheel drive shaft 14 is hollow and is fitted around the portion of the rear wheel power output shaft 13 within the housing of this four wheel drive power transfer device 3, and on its outside there is fixedly mounted a sprocket wheel 16. An endless chain 18 is fitted around this sprocket wheel 16 and another sprocket wheel 17 provided below said sprocket wheel 16, from the point of view of the figure and in the actual vehicle body also, and with its central axis parallel to the central axis of said sprocket wheel 16. The sprocket wheel 17 is fixedly mounted on a front wheel power output shaft 15, one end of which protrudes from the housing of this four wheel drive power transfer device 3 in the leftwards direction in the figure, i.e. towards the front end of the vehicle in this particular exemplary implementation. Thus, the power distribution (torque) ratio between the intermediate front wheel drive shaft 14 and the rear wheel power output shaft 13 is determined, when this four wheel drive power transfer device 3 is operating, by the relative tooth counts of the sun gear 11 and the ring gear 12.

Further, within the four wheel drive power transfer device 3 there is provided a hydraulically operated wet type clutch 19, which selectively either rotationally connects together the sun gear 11 and the ring gear 12, or alternatively allows said members to rotate freely with respect to one another. This wet clutch 19 is selectively operated by an electrically actuated electric/hydraulic control device 20. Accordingly, the four wheel drive power transfer device 3, which receives rotational power input from the gear transmission mechanism 5 and outputs said rotational power to the rear wheel power output shaft 13 and to the front wheel power output shaft 15, can be caused either to provide differential action for distributing said rotational power between said rear wheel power output shaft 13 and said front wheel power output shaft 15, or not to provide any such differential action and just to drive said shafts 13 and 17 independently. Via a universal joint 21 of a per se known sort, the rear end of the rear wheel power output shaft 13 rotationally drives the front end of a rear wheel propeller shaft 22. And the rear end of this rear wheel propeller shaft 22 is connected via another universal joint 23 to a differential device, not particularly shown, for the rear wheels 24 of the vehicle.

And, via a universal joint 25 also of a per se known sort, the front end of the rear wheel power output shaft 13 rotationally drives the rear end of a front wheel propeller shaft 24. Thus, the front wheel propeller shaft 24 extends alongside and generally below the automatic speed change device 2 including the fluid torque converter 4 therein, roughly parallel to the longitudinal axis thereof. The front end of this front wheel propeller shaft 24 is rotationally connected, via another universal joint 27 also of a per se known sort, to the outer end of a drive shaft, which constitutes the power input shaft of a front differential device, not shown either, which drives the front wheels 28 of the vehicle.

OPERATION OF THIS POWER TRAIN

This vehicle power train operates as follows. When the clutch 19 of the four wheel drive power transfer device 3 is operated by the electrically actuated electric/hydraulic control device 20 so as not to rotationally connect together the sun gear 11 and the ring gear 12, then the central differential device 8 functions so as to provide its differential effect between the rear wheel power output shaft 13 and the intermediate front wheel drive shaft 14, i.e. so as to receive rotational power provided by the engine 1 of the vehicle and transmitted to said four wheel drive power transfer device 3 via the automatic speed change device 2, and to distribute said rotational power between the rear wheels 24 of the vehicle taken as a combination and the front wheels 28 of the vehicle taken as a combination. Accordingly, in this case, the power distribution (torque) ratio between the front wheels 28 of the vehicle and the rear wheels 24 of the vehicle is determined, when the four wheel drive power transfer device 3 is operating in the above mode, by the ratio of the tooth counts of the sun gear 11 and the ring gear 12. On the other hand, when the clutch 19 of the four wheel drive power transfer device 3 is operated by the electrically actuated electric/hydraulic control device 20 so as to rotationally connect together the sun gear 11 and the ring gear 12, then the central differential device 8 functions so as to provide no such differential effect between the rear wheel power output shaft 13 and the intermediate front wheel drive shaft 14, i.e. so as to distribute the rotational power provided from the engine 1 via the automatic speed change device 2 directly to the rear wheels 24 of the vehicle taken as a combination and the front wheels 28 of the vehicle taken as a combination in an even 50/50 fashion without any differential effect.

Acceleration slippage of the vehicle wheels is prevented by the connection or the shutting off of a brake hydraulic circuit, not particularly shown, according to the operation of hydraulic switchover solenoids 29a and 29b.

THE TRANSMISSION CONTROL SYSTEM

The following detectors and sensors are provided to this system. A road speed sensor 30 detects a value representative of the road speed of the vehicle by measuring the rotational speed of the rear wheel power output shaft 13, and outputs an electrical signal representative thereof. A throttle position sensor 31 detects a value representative of the current load on the internal combustion engine 1 by measuring the opening angle of the throttle valve (not particularly shown) of a carburetor (not shown either) of said engine 1, and outputs an electrical signal representative thereof. And a neutral start switch 32 detects when the automatic speed change device 2 is set to its neutral range, and outputs an electrical signal representative thereof. The output signals of these three sensors 30, 31, and 32 are fed to a transmission control device 40. This transmission control device 40 outputs control signals for controlling the electric/hydraulic control device 20 for the four wheel drive power transfer device 3, the electrical/hydraulic control mechanism 7 for the gear transmission mechanism 5, and the lock up clutch control solenoid 6. And the output signals of the road speed sensor 30 and the throttle position sensor 31 are also fed to a skidding control device 60, which provides an output signal to the transmission control device 40. Further, to this system there are provided: a left front wheel rotational speed sensor 51, which detects a value representative of the rotational speed of the left front wheel 28 of the vehicle, and outputs an electrical signal representative thereof; a right front wheel rotational speed sensor 52, which detects a value representative of the rotational speed of the right front wheel 28 of the vehicle, and outputs an electrical signal representative thereof; and a rear wheels rotational speed sensor 53, which detects a value representative of the average of the rotational speeds of the rear wheels 24 of the vehicle, and outputs an electrical signal representative thereof. The output signals of these wheel rotational speed sensors 51, 52, and 53 are fed to the skidding control device 60.

Figure 3:
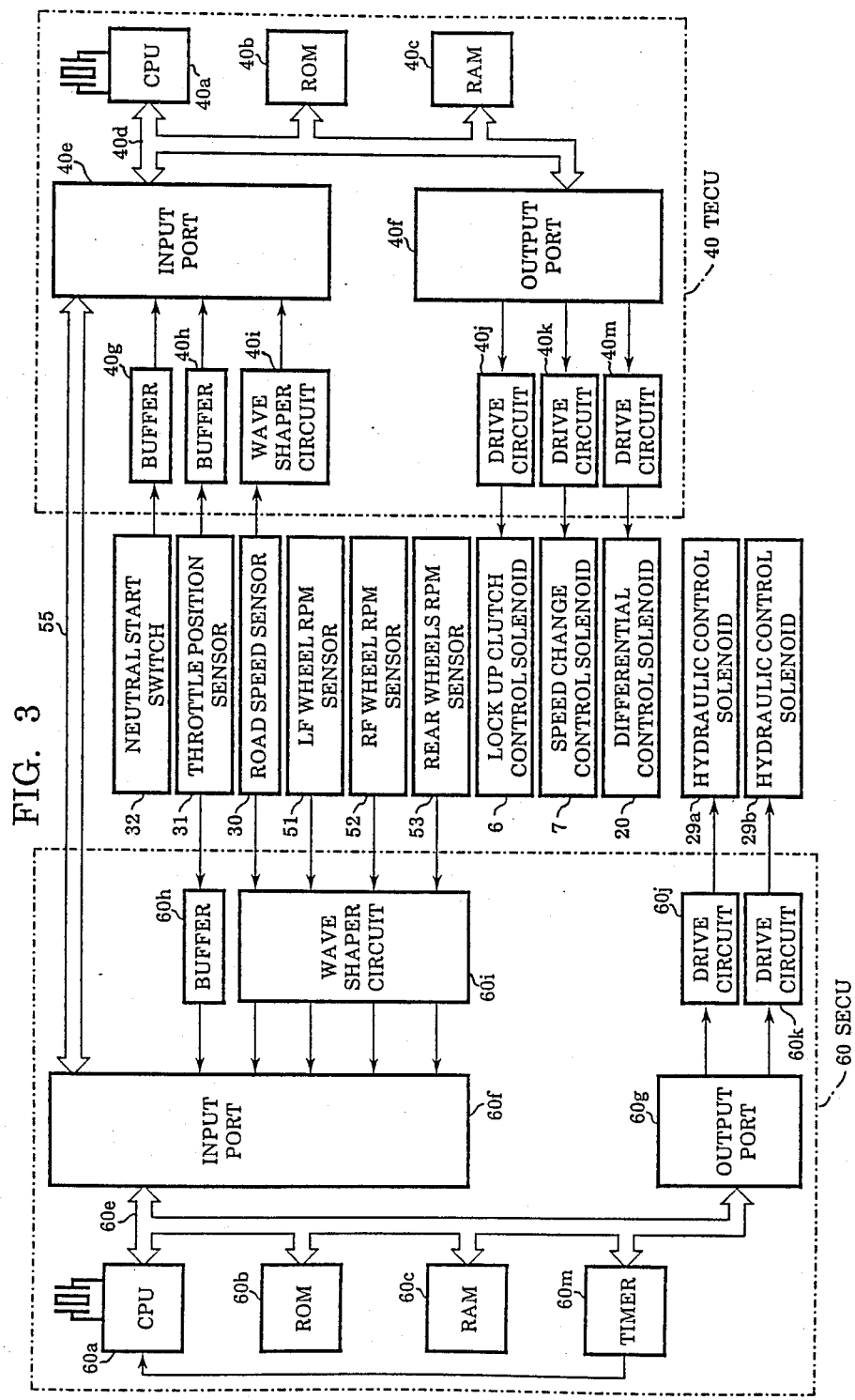
FIG. 3 is a block diagrammatical illustration of the structure of particular realizations of a transmission control device and of a skidding control device, which are micro computers and associated circuitry.

Now, in FIG. 3 there is shown a block diagrammatical illustration of the structures of particular realizations of the transmission control device 40 and the skidding control device 60. In this first preferred embodiment of the present invention, said transmission control device 40 and skidding control device 60 are each concretely realized as a micro computer and its associated circuitry, said micro computers each operating at the behest of a control program which will be detailed shortly. However, it should be particularly understood that such realizations as micro computers are not the only ways in which the transmission control device 40 and the skidding control device 60 can be provided; in other possible embodiments they could be constituted as electrical devices not incorporating microprocessors, or indeed they could be purely hydraulic devices.

In detail, first with regard to the transmission control device 40, in FIG. 3 the reference numeral 40a denotes a CPU (central processing unit) which obeys said control program to be described shortly, and which inputs data, performs calculations, and outputs data; the reference numeral 40b denotes a ROM (read only memory) which stores said program to be described shortly, and initialization data therefor and so on; and the reference numeral 40c denotes a RAM (random access memory)

which stores the results of certain intermediate calculations and data and so on; and these devices together constitute a logical calculation circuit, being joined together by a common bus 40d which also links them to an I/O port 40e and an output port 40f which together perform input and output for the system.

In more detail, in this transmission control device 40, the CPU 40a, via the I/O port 40e, receives input data from a buffer 40g which receives the electrical signal outputted from the neutral start switch 32, and also receives input data from another buffer 40h which receives the electrical signal outputted from the throttle position sensor 31. Further, said CPU 40a, again via said I/O port 40e, also receives input data from a wave shaper circuit 40i which receives the electrical signal outputted from the road speed sensor 30, and also sends data to and receives data from the skidding control device 60 via a data bus 55. Also said CPU 40a, via the output port 40f, sends output control data to a drive circuit 40j which sends an actuating electrical signal to the lock up clutch control solenoid 6, sends output control data to another drive circuit 40k which sends an actuating electrical signal to a speed change control solenoid of the electrical/hydraulic control mechanism 7 for controlling the automatic speed change device 2, and also sends output control data to yet another drive circuit 40m which sends an actuating electrical signal to a differential device control solenoid of the electric/hydraulic control device 20 for controlling the four wheel drive power transfer device 3.

Next in detail with regard to the skidding control device 60, in FIG. 3 the reference numeral 60a denotes a CPU (central processing unit) which obeys said control program to be described shortly, and which inputs data, performs calculations, and outputs data; the reference numeral 60b denotes a ROM (read only memory) which stores said program to be described shortly, and initialization data therefor and so on; the reference numeral 60c denotes a RAM (random access memory) which stores the results of certain intermediate calculations and data and so on; and the reference numeral 60m denotes a timer; and these devices together constitute a logical calculation circuit, being joined together by a common bus 60e which also links them to an I/O port 60f and an output port 60g which together perform input and output for the system. The timer 60m is autonomous, and interrupts the CPU 60a when a certain determinate time interval has elapsed.

In more detail, in this skidding control device 60, the CPU 60a, via the I/O port 60e, receives input data from a buffer 60h which receives the electrical signal outputted from the throttle position sensor 31. Further, said CPU 60a, again via said I/O port 60f, also receives input data from a wave shaper circuit 60i which receives the electrical signal outputted from the road speed sensor 30, the electrical signal outputted from the left front wheel rotational speed sensor 51, the electrical signal outputted from the right front wheel rotational speed sensor 52, and the electrical signal outputted from the rear wheels rotational speed sensor 53, and also sends data to and receives data from the skidding control device 60 via the aforementioned data bus 55. Also said CPU 60a, via the output port 60g, sends output control data to a drive circuit 60j which sends an actuating electrical signal to the hydraulic control solenoid 29a, and also sends output control data to another drive circuit 60k which sends an actuating electrical signal to the hydraulic control solenoid 29b.

THE FIRST PREFERRED EMBODIMENTS

Figure 4:
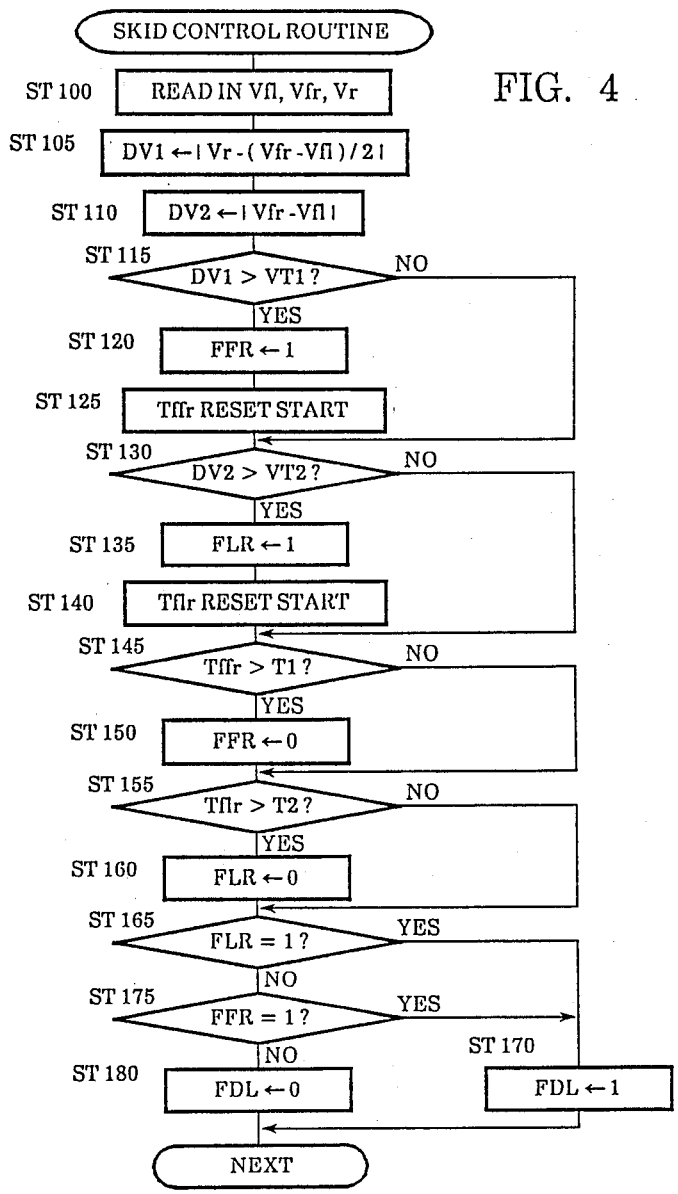
FIG. 4 is a flow chart for a portion of a skidding control routine obeyed by said skidding control device micro computer, said skidding control routine being executed at regular intervals of approximately four milliseconds.
Figure 5:
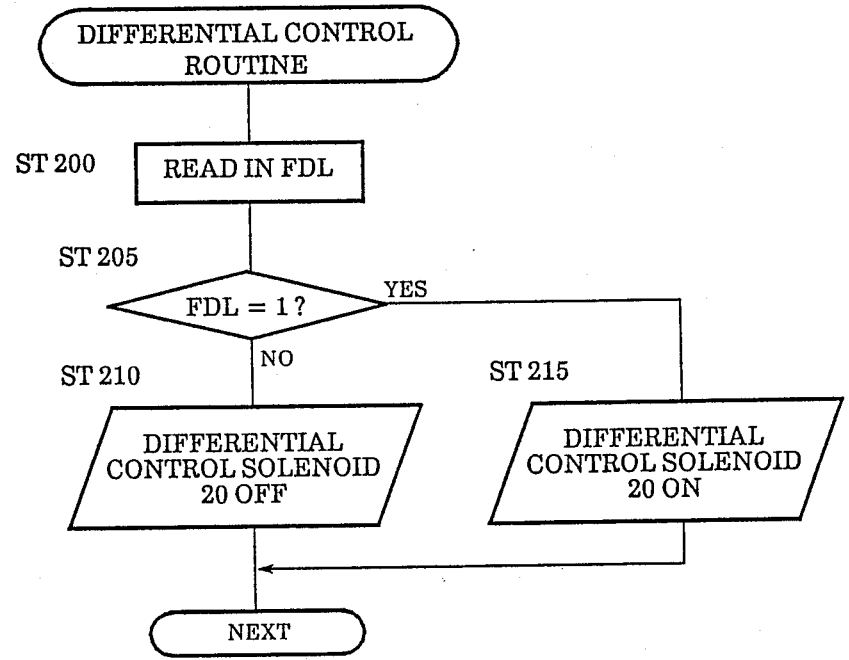
FIG. 5 is a flow chart for a portion of a transmission control routine obeyed by said transmission control device micro computer, said transmission control routine being executed at regular intervals of approximately four milliseconds.

Now, in FIGS. 4 and 5, flow charts are shown for the aforementioned control programs which direct the operation of, respectively, the skidding control device 60 and the transmission control device 40, according to the first preferred embodiment of the skidding control method of the present invention, so as to realize the first preferred embodiment of the skidding control device of the present invention. These flow charts will now be explained.

THE OPERATION OF THE SKIDDING CONTROL DEVICE 60

FIG. 4 shows the skidding control routine, which is executed at regular intervals of approximately four milliseconds, after the skid control device 60 is started as the four wheel drive vehicle incorporating it is driven. As this skidding control routine is carried out, a vehicle wheels rotational speeds calculation routine not shown derives the respective rotational speeds Vfl, Vfr, and Vr of the left front vehicle wheel 28, of the right front vehicle wheel 28, and of the rear vehicle wheels 24 (the average of their rotational speeds), based upon the data received from the wave shaper circuit 60i based upon the electrical signals outputted from the left front wheel rotational speed sensor 51, the right front wheel rotational speed sensor 52, and the rear wheels rotational speed sensor 53.

Thus, this skidding control routine, at its beginning in the first step ST100, inputs these respective rotational speeds Vfl, Vfr, and Vr of the left front vehicle wheel 28, of the right front vehicle wheel 28, and of the rear vehicle wheels 24, and stores them in appropriate locations of the RAM 60c. Then the flow of control passes next to the step ST105.

In this step ST105, the absolute value of the difference between the average rotational speed (Vfl+Vfr)/2 of the front wheels 28 and the average rotational speed Vr of the rear wheels 24 is calculated, and the value of a variable DV1 is set to this front/rear difference value. Next, the flow of control passes to the step ST110.

In this step ST110, the absolute value of the difference between the rotational speed Vfl of the left front wheel 28 and the rotational speed Vfr of the right front wheel 28 is calculated, and the value of a variable DV2 is set to this left/right difference value. Next, the flow of control passes to the decision step ST115.

In this decision step ST115, a decision is made as to whether or not this front/rear difference value DV1 is greater than a certain determinate standard front/rear difference value VT1, or not. If the answer to this decision is NO, so that the current front/rear difference value DV1 is less than said standard value VT1, then it is considered that the vehicle is not skidding, at least as far as front/rear comparison is concerned, and next the flow of control skips to pass to the step ST130. On the other hand, if the answer to this decision is yes, so that the current front/rear difference value DV1 is in fact greater than said standard value VT1, then it is considered that front or rear wheel skidding has been established, and next the flow of control passes to the step ST120.

In this step ST120, a front/rear difference flag FFR is set to unity, to indicate such front or rear wheel skidding, and next the flow of control passes to the step ST125.

In this step ST125, a front/rear difference timer Tffr is reset and starts to time a determinate time period, and next the flow of control passes to the decision step ST130.

In this decision step ST130, a decision is made as to whether or not the left/right difference value DV2 is greater than a certain determinate standard left/right difference value VT2, or not. If the answer to this decision is NO, so that the current left/right difference value DV2 is less than said standard value VT2, then it is considered that the vehicle is not skidding, at least as far as left/right comparison is concerned, and next the flow of control skips to pass to the step ST145. On the other hand, if the answer to this decision is Yes, so that the current left/right difference value DV2 is in fact greater than said standard value VT2, then it is considered that left or right wheel skidding has been established, and next the flow of control passes to the step ST135.

In this step ST135, a left/right difference flag FLR is set to unity, to indicate such left or right wheel skidding, and next the flow of control passes to the step ST140.

In this step ST140, a left/right difference timer Tflr is reset and starts to time a determinate time period, and next the flow of control passes to the decision step ST145.

In this decision step ST145, a decision is made as to whether or not the time as timed by the front/rear difference timer Tffr, which was started in the step ST125 of a previous iteration through this skidding control routine, has now become greater than a determinate time period T1. If the answer to this decision is YES, so that the time period during which front/rear wheel skidding has been occurring has now become greater than T1, then next the flow of control passes to the step ST150. On the other hand, if the answer to this decision is NO, so that the time period during which front/rear wheel skidding has been occurring has not yet become greater than T1, then next the flow of control skips to pass to the step ST155.

In this step ST150, the value of the front/rear difference flag FFR is reset to zero, so as to indicate that, since the determinate time T1 has elapsed, it is considered that front/rear skidding is no longer occurring. Next, the flow of control passes to the decision step ST155.

In this decision step ST155, a decision is made as to whether or not the time as timed by the left/right difference timer Tflr, which was started in the step ST140 of a previous iteration through this skidding control routine, has now become greater than a determinate time period T2. If the answer to this decision is YES, so that the time period during which left/right wheel skidding has been occurring has now become greater than T2, then next the flow of control passes to the step ST160. On the other hand, if the answer to this decision is NO, so that the time period during which left/right wheel skidding has been occurring has not yet become greater than T2, then next the flow of control skips to pass to the step ST165.

In this step ST160, the value of the left/right difference flag FLR is reset to zero, so as to indicate that, since the determinate time T2 has elapsed, it is considered that left/right skidding is no longer occurring. Next, the flow of control passes to the decision step ST165.

In this decision step ST165, a decision is made as to whether or not the flag FLR is currently set to unity. If the answer to this decision is YES, so that currently left or right wheel skidding is deemed to be occurring, then next the flow of control passes to the step ST170. On the other hand, if the answer to this decision is NO, so that currently left or right wheel skidding is not deemed to be occurring, then next the flow of control passes to the decision step ST175.

In this decision step ST175, a decision is made as to whether or not the flag FFR is currently set to unity. If the answer to this decision is YES, so that currently front or rear wheel skidding is deemed to be occurring, then next the flow of control passes to the step ST170. On the other hand, if the answer to this decision is NO, so that currently front or rear wheel skidding is not deemed to be occurring, then next the flow of control passes to the step ST180.

In the step ST170, which is thus reached if either front/rear or left/right skidding is considered to be currently occurring, the value of a four wheel drive power transfer device 3 control flag FDL is set to unity. The value of this flag FDL is available, via the bus 55, to the program which is being executed by the transmission control device 40, as will be described shortly. Next, the flow of control passes to leave this skidding control routine via the label "NEXT", without doing anything further; and again approximately four milliseconds later this skidding control routine is repeated.

On the other hand, in the step ST180, which is thus reached if neither front/rear or left/right skidding is considered to be currently occurring, the value of this four wheel drive power transfer device 3 control flag FDL is set to zero. Again, the value of this flag FDL is available, via the bus 55, to the program which is being executed by the transmission control device 40, as will be described shortly. Then, as before, the flow of control passes to leave this skidding control routine via the label "NEXT", without doing anything further; and again approximately four milliseconds later this skidding control routine is repeated.

THE OPERATION OF THE TRANSMISSION CONTROL DEVICE 40

FIG. 5 shows the portion of the transmission control routine which controls the electric/hydraulic control device 20 for the four wheel drive power transfer device 3, said transmission control routine being, like the skidding control routine explained above, executed at regular intervals of approximately four milliseconds after the transmission control device 40 is started as the four wheel drive vehicle incorporating it is driven.

After the start of this routine, first, in the step ST200, the value of the flag FDL, set in the skidding control routine of FIG. 4, is read in from the skid control device 60 to the transmission control device 40 via the bus 55. Next, the flow of control passes to the decision step ST205.

In this decision step ST205, a decision is made as to whether or not this flag FDL is set to unity. If the answer to this decision is YES, so that currently FDL=1, then the skidding control device 60 is currently considering that skidding of at least one wheel of the vehicle is occurring, and therefore next the flow of control passes to the step ST215. On the other hand, if the answer to this decision is NO, so that currently FDL=0, then the skidding control device 60 is currently considering that skidding of even one wheel of the vehicle is not occurring, and therefore next the flow of control passes to the step ST210.

In the step ST215, since it is decided that the vehicle is currently skidding, the electric/hydraulic control device 20 for the four wheel drive power transfer device 3 is energized, i.e. is turned ON, so that the clutch 19 of said four wheel drive power transfer device 3 is engaged, to rotationally connect together the sun gear 11 and the ring gear 12 thereof, thus to cause the four wheel drive power transfer device 3 to cease its differential action between the front vehicle wheels 28 and the rear vehicle wheels 24, to thus directly drive said front vehicle wheels 28 and said rear vehicle wheels 24 as an anti skidding measure. Next, the flow of control passes via the label "NEXT" to leave this portion of the transmission control routine, without doing anything further.

On the other hand, in the step ST210, since it is decided that the vehicle is not currently skidding, said electric/hydraulic control device 20 for the four wheel drive power transfer device 3 is deenergized, i.e. is turned OFF, so that the clutch 19 of said four wheel drive power transfer device 3 is disengaged, so as not to rotationally connect together the sun gear 11 and the ring gear 12 thereof, thus now allowing the four wheel drive power transfer device 3 to provide its differential action between the front vehicle wheels 28 and the rear vehicle wheels 24, to thus drive said front vehicle wheels 28 and said rear vehicle wheels 24 while distributing rotational power and torque between them with differential action. Next, the flow of control passes via the label "NEXT" to leave this portion of the transmission control routine, without doing anything further.

And, by the repetition of the FIG. 5 program in a four millisecond cycle, the control of the electric/hydraulic control device 20 of the four wheel drive power transfer device 3 is maintained.

OVERALL SYSTEM OPERATION

Figure 6:
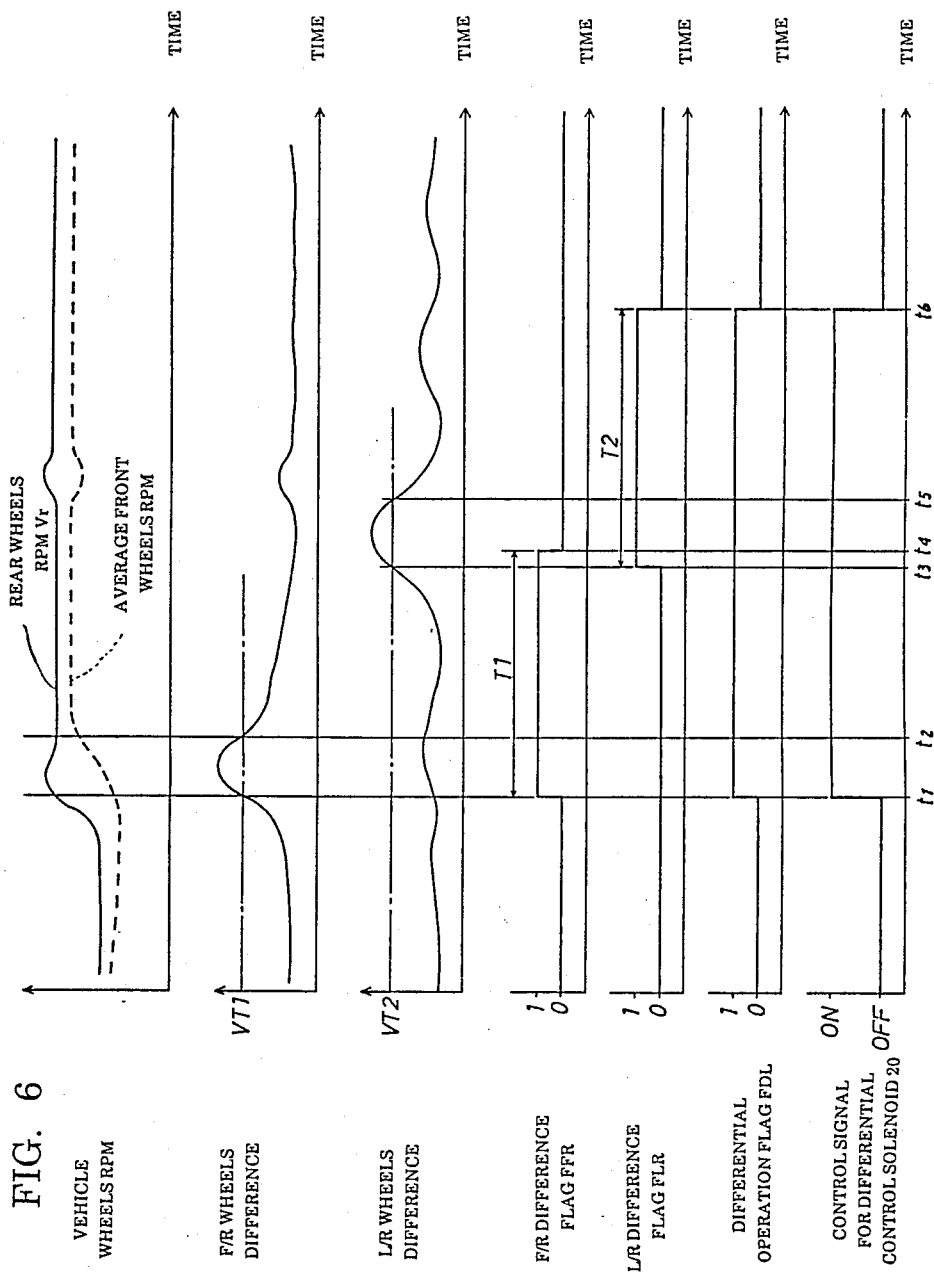
FIG. 6 is a time chart for illustrating an exemplary episode of operation of the skidding control device and the transmission control device of FIG. 3 according to the programs whose flow charts are shown in FIGS. 4 and 5.

FIG. 6 is a time chart for illustrating an exemplary episode of operation of the skidding control device and the transmission control device of FIG. 3 according to the programs whose flow charts are shown in FIGS. 4 and 5. At the time point t1 in this figure, in four wheel drive operation, in this exemplary operational episode, skidding starts of either the front vehicle wheels 28 or the rear vehicle wheels 24, and the front/rear wheels difference value DV1 rises above the threshold value VT1 therefor. Therefore, at the time point t1, the flag FFR is set to 1, and correspondingly the flag FDL is also set to 1. Therefore, at this time point t1, the electric/hydraulic control device 20 for the four wheel drive power transfer device 3 is energized, i.e. is turned ON, so that the clutch 19 of said four wheel drive power transfer device 3 is engaged, to rotationally connect together the sun gear 11 and the ring gear 12 thereof, thus to cause the four wheel drive power transfer device 3 to cease its differential action between the front vehicle wheels 28 and the rear vehicle wheels 24, to thus directly drive said front vehicle wheels 28 and said rear vehicle wheels 24 as an anti skidding measure. Also, at this time point t1, the timer Tffr is started. Since the differential action between the front vehicle wheels 28 and the rear vehicle wheels 24 has thus been stopped, after the clutch 19 bites, at the time point t2 the front-/rear wheels difference value DV1 drops below the threshold value VT1 therefor; however, this does not necessarily mean that the skidding condition has actually terminated, only that it has been controlled.

Further, in this exemplary operational episode, at the time point t3, before the time period T1 of the front-/rear timer Tffr has elapsed from the time point t1, the skidding starts of either the left or the right front vehicle wheel 28, and the left/right front wheels difference value DV2 rises above the threshold value VT2 therefor. Therefore, at the time point t3, the flag FLR is set to 1, and since the flag FDL is currently set to 1 this value is maintained. Also, at this time point t3, the timer Tflr is started.

At the time point t4, after the time period T1 of the front/rear timer Tffr has elapsed from the time point t1, the flag FFR is reset to 0. But, since the flag FLR remains set to 1, the state of the flag FDL being set to 1 is maintained. And, at an exemplarily later time point t5, the left/right wheels difference value DV2 drops below the threshold value VT2 therefor; again, however, this does not necessarily mean that the skidding condition has actually terminated.

Next, at the time point t6, after the time period T2 of the left/right timer Tflr has elapsed from the time point t1, the flag FLR is reset to 0. And, since the flag FFR is already set to 0, at this time point the state of the flag FDL being set to 1 is terminated, and said flag FDL instead now becomes set to 0. Therefore, at this time point t6, the electric/hydraulic control device 20 for the four wheel drive power transfer device 3 is deenergized, i.e. is turned OFF, so that (after a certain time period for the operation of the solenoid of the electric/-hydraulic control device 20 is allowed for) the clutch 19 of said four wheel drive power transfer device 3 is now disengaged, so as not to rotationally connect together the sun gear 11 and the ring gear 12 thereof, thus now allowing the four wheel drive power transfer device 3 again to provide its differential action between the front vehicle wheels 28 and the rear vehicle wheels 24, to thus drive said front vehicle wheels 28 and said rear vehicle wheels 24 while distributing rotational power and torque between them with differential action, in the normal operational mode.

This action, therefore, means that at any time, if either of the flags FFR or FLR becomes set to 1, then the flag FDL will be set to 1, so that the four wheel drive power transfer device 3 will become locked up so that the front wheels 28 and the rear wheels 24 will be directly driven without differential action being provided between them; but, when both of the flags FFR or FLR becomes reset to 0, then the flag FDL will be reset to 0, so that the four wheel drive power transfer device 3 will become unlocked so that the front wheels 28 and the rear wheels 24 will be driven with differential action being provided between them. Thus, the operation is maintained and repeated.

Figure 1:
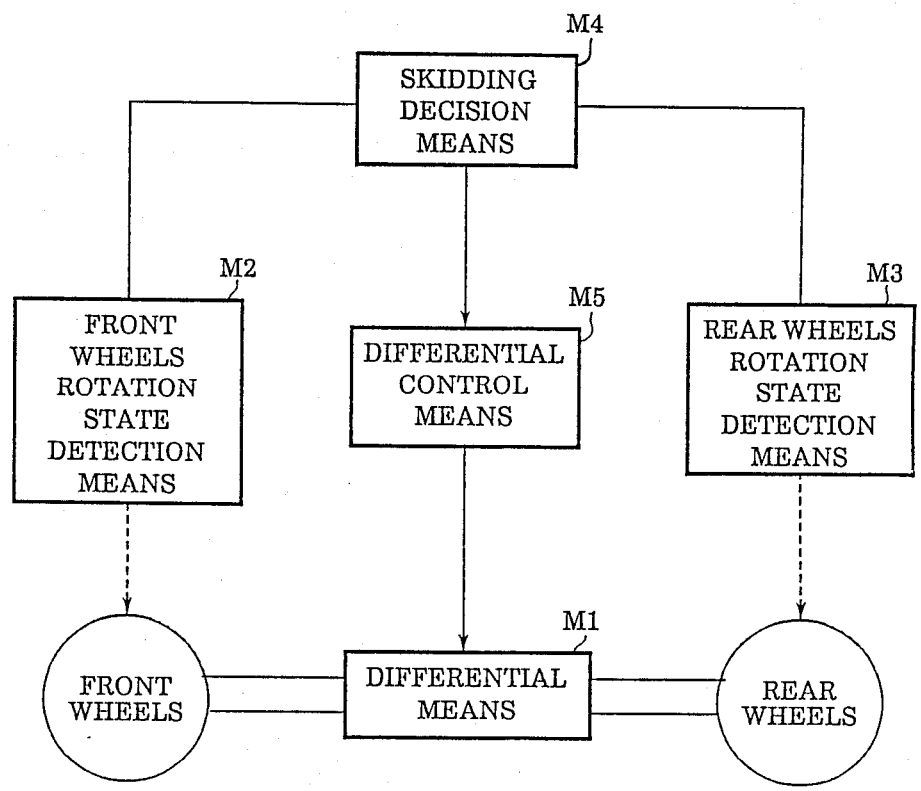
FIG. 1 is a schematic block diagram showing the overall constitution of a more general side of the device aspect of the present invention.

Referring to the schematic illustration of the present invention shown in FIG. 1, in this first preferred embodiment: the four wheel drive power transfer device 3 corresponds to the differential means M1; the left front wheel rotational speed sensor 51 and the right front wheel rotational speed sensor 52 and the skid control device 60 together correspond to the front wheels rotation state detecting means M2; and the rear wheels rotational speed sensor 53 and the skid control device 60 together correspond to the rear wheels rotation state detecting means M3. The steps ST105, ST110, ST115, and ST130 as executed by the skid control device 60 correspond to the skidding decision means M4. The steps ST120, ST125, ST135, ST140, ST145, ST150, ST155, ST160, ST165, ST170, ST175, and ST180 as executed by the skid control device 60 and the steps ST205, ST210, and ST215 as executed by the transmission control device 40 correspond to the differential control means M5.

Thus, in this preferred embodiment, based upon the output signals from the left front wheel rotational speed sensor 51, and right front wheel rotational speed sensor 52, and the rear wheels rotational speed sensor 53, skidding is determined when the front/rear difference value DV1 exceeds the determinate value VT1 therefor or the left/right difference value DV2 exceeds the determinate value VT2 therefor, and in such a case the differential operation of the four wheel drive power transfer device 3 is stopped, thus putting the transmission system of the vehicle into the direct drive condition as far as distribution of power between the front and the rear wheels thereof is concerned. Timing is started from when skidding is detected, and, when both the front-/rear standard time period T1 and also the left/right standard time period T2 have elapsed, the differential action of the central differential device 8 is restored, thus putting the transmission system of the vehicle into the differential provision condition as far as distribution of power between the front and the rear wheels thereof is concerned. No particular driver action is required for this locking and unlocking control of the central differential device 8, which is performed automatically. Hence, skidding is restricted, and the running stability and the braking stability of the vehicle are enhanced.

This skid control method and device utilize the central differential device 8 and the clutch 19 incorporated therein which are already provided to a four wheel drive type transmission, and hence the construction is relatively simple and the provision is economical. Since the decision as to whether or not skidding is occurring is based upon the values DV1 and DV2, whichever of the four vehicle wheels should skid, the starting and stopping of skidding control is possible. The present invention is particularly effective upon a muddy or snow covered road.

While the time periods T1 and T2 are being timed, if skidding is again detected, both of these timings are restarted. This avoids unnecessary operation of the electric/hydraulic control device 20 and of the solenoid incorporated therein, and minimized hunting thereof, thus providing advantages as far as durability of the system and reliability of the electric/hydraulic control device 20 and the clutch 19 are concerned.

Since this skidding control method and device operate by providing direct driving for the front vehicle wheels and for the rear vehicle wheels, if a problem should develop in the braking system for preventing skidding (for example), then nevertheless the anti skidding control can be still carried out.

In the above disclosed preferred embodiment of the present invention there are utilized a transmission control device 40 and a skid control device 60 which were separately provided; but this is not to be considered as limiting, and these devices could be implemented as different control program portions for one and the same micro computer. Furthermore, although the above disclosed embodiments of the anti skidding method and device of the present invention do not utilize the existing acceleration skidding (or slipping) control system including the solenoids 29a and 29b at all, nevertheless in other preferred embodiments these two systems could be integrated. In such a manner, the control accuracy of the anti skidding control could be improved, and faster anti skidding control could be made available.

Further, in the above disclosed preferred embodiment of the present invention, the left/right rotational speed difference was only measured for the two front wheels 28 of the vehicle and not for the two rear wheels 24, but this is not to be conceived of as being limitative of the present invention, which would benefit from detecting such rear wheel left/right rotational speed difference, thus improving anti skidding control further.

Thus, according to this method and device, referring to the overall schematic view of this first embodiment of the present invention shown in FIG. 1, when the skidding state is determined by the means M4 according to the outputs of the means M2 and M3, the differential action of the differential device M1 is stopped; and when a certain time period has elapsed after skidding has stopped the device M5 causes the differential action of the differential device M1 to be restarted. Thus, in the skidding state the differential action between the front and the rear vehicle wheels is eliminated, and this condition is maintained until it is predicted that the skidding condition will have disappeared. Thus skidding control is started automatically when it is decided that skidding is occurring, without requiring particular action by the vehicle driver, and said skidding control is likewise terminated automatically. Accordingly vehicle stability on a slippery road surface is greatly enhanced, without unduly burdening the vehicle driver with any additional control responsibilities.

THE SECOND PREFERRED EMBODIMENTS

Figure 7:
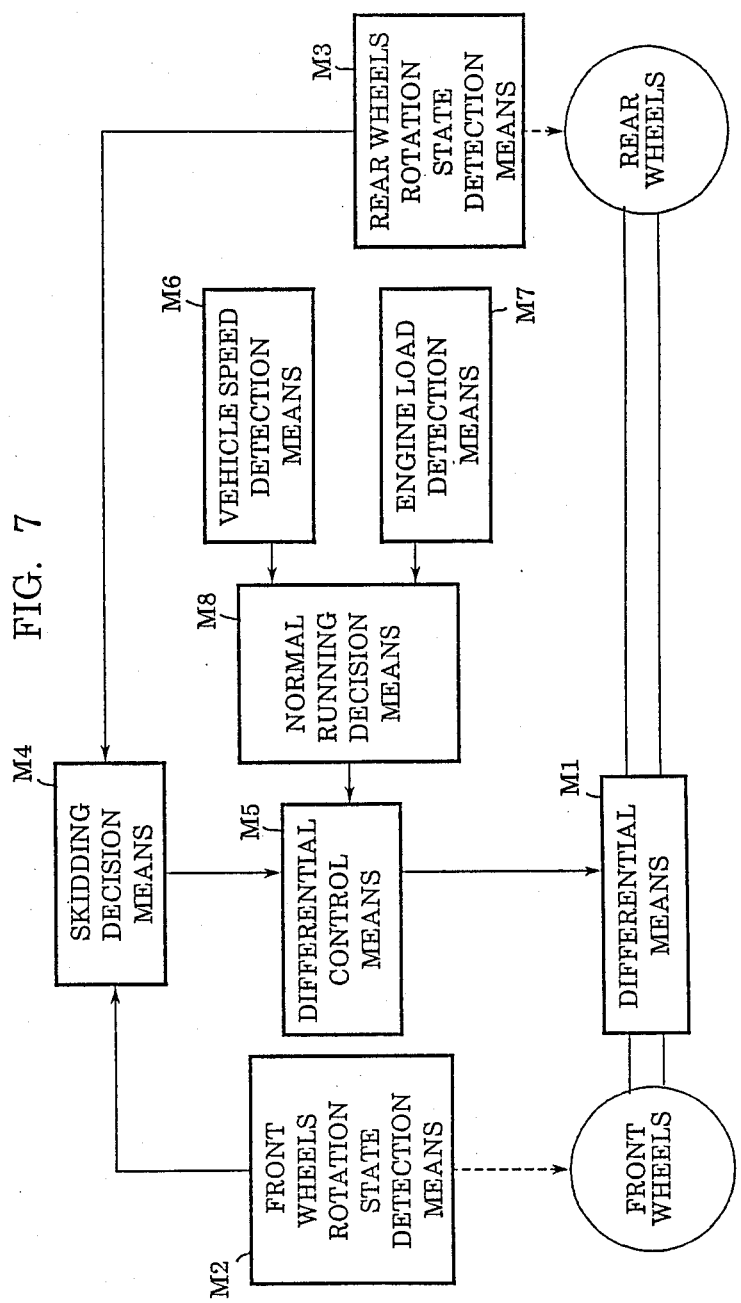
FIG. 7 is a schematic block diagram showing the overall constitution of a more particular preferred embodiment of the device aspect of the present invention.
Figure 8:
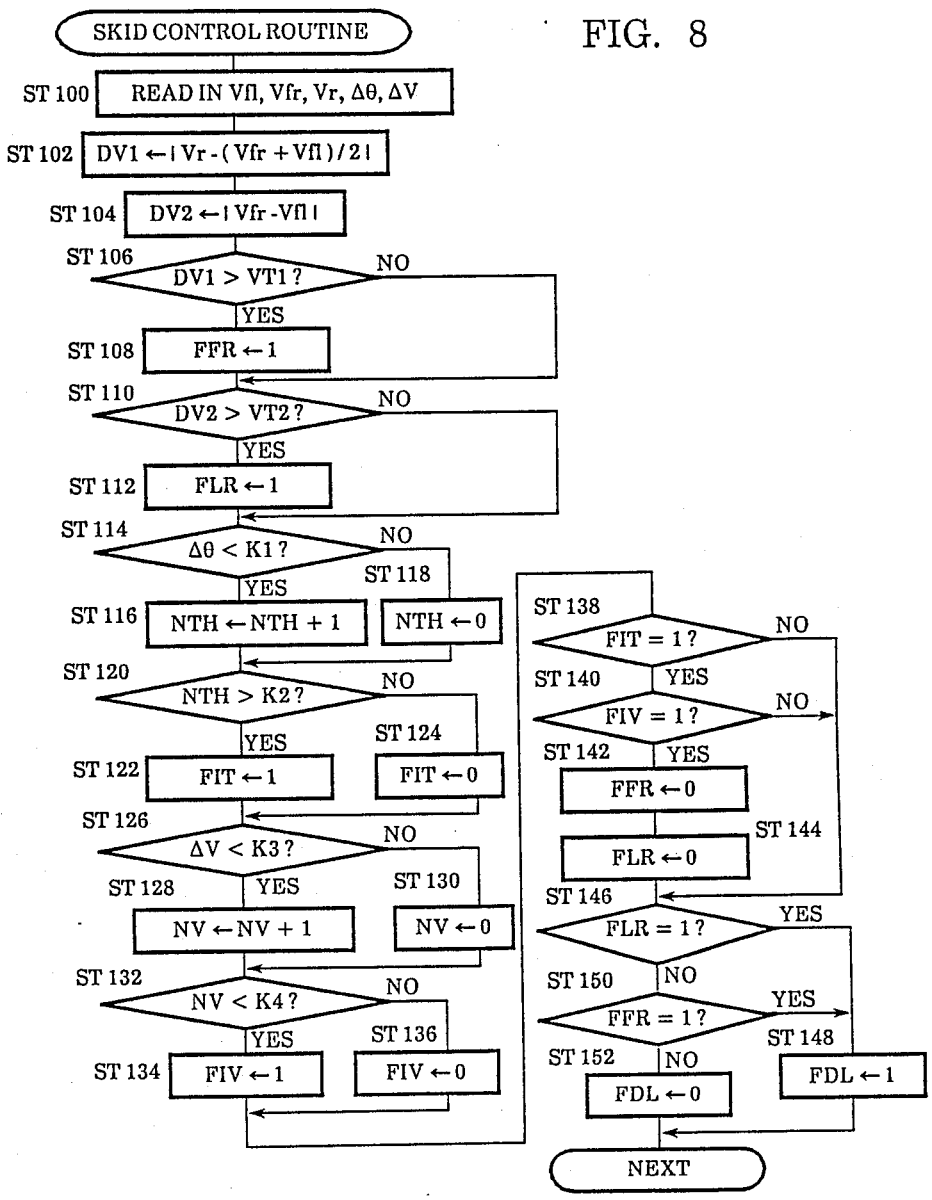
FIG. 8 is a flow chart for a portion of a skidding control routine, like the routine of FIG. 4, obeyed by said more particular preferred embodiment skidding control device micro computer, said skidding control routine again being executed at regular intervals of approximately four milliseconds.

Now, in FIG. 8, a flow chart is shown for the control program which directs the operation of the skidding control device 60, according to the second preferred embodiment of the skidding control method of the present invention, so as to realize the second preferred embodiment of the skidding control device of the present invention. The schematic illustration of these second preferred embodiments is shown in FIG. 7; and the physical construction of the vehicle transmission system to which they are applied, as well as the exemplary internal structure for the transmission control device 40 and the skid control device 60 thereof, are quite the same as in the first preferred embodiments as described with reference to FIGS. 2 and 3, and accordingly description thereof will be eschewed in the interests of brevity of explanation. Further, the flow chart of FIG. 5, for the operation of the transmission control device transmission control device 40, also applies to these second preferred embodiments, as well as to the first. The FIG. 8 flow chart will now be explained.

THE OPERATION OF THE SKIDDING CONTROL DEVICE 60

FIG. 8 shows the skidding control routine, which is executed at regular intervals of, this time, approximately twenty milliseconds, after the skid control device 60 is started as the four wheel drive vehicle incorporating it is driven. As before, as this skidding control routine is carried out, a vehicle wheels rotational speeds calculation routine not shown derives the respective rotational speeds Vfl, Vfr, and Vr of the left front vehicle wheel 28, of the right front vehicle wheel 28, and of the rear vehicle wheels 24 (the average of their rotational speeds), based upon the data received from the wave shaper circuit 60i based upon the electrical signals outputted from the left front wheel rotational speed sensor 51, the right front wheel rotational speed sensor 52, and the rear wheels rotational speed sensor 53. Also, by throttle opening calculations not particularly described, the change $\Delta\theta$ in the throttle opening is computed at regular intervals, according to the ongoing value of the output signal of the throttle position sensor 31. Likewise, by vehicle speed calculations also not particularly described, the change $\Delta v$ in the vehicle road speed is computed at regular intervals, according to the ongoing value of the output signal of the vehicle road speed sensor 30.

Thus, this skidding control routine, at its beginning in the first step ST100, inputs these respective rotational speeds Vfl, Vfr, and Vr of the left front vehicle wheel 28, of the right front vehicle wheel 28, and of the rear vehicle wheels 24, as well as the values of $\Delta\theta$ and $\Delta v$, and stores them in appropriate locations of the RAM 60c. Then the flow of control passes next to the step ST102.

In this step ST102, the absolute value of the difference between the average rotational speed (Vfl+Vfr)/2 of the front wheels 28 and the average rotational speed Vr of the rear wheels 24 is calculated, and the value of a variable DV1 is set to this front/rear difference value. Next, the flow of control passes to the step ST104.

In this step ST104, the absolute value of the difference between the rotational speed Vfl of the left front wheel 28 and the rotational speed Vfr of the right front wheel 28 is calculated, and the value of a variable DV2 is set to this left/right difference value. Next, the flow of control passes to the decision step ST106.

In this decision step ST106, a decision is made as to whether or not this front/rear difference value DV1 is greater than a certain determinate standard front/rear difference value VT1, or not. If the answer to this decision is NO, so that the current front/rear difference value DV1 is less than said standard value VT1, then it is considered that the vehicle is not skidding, at least as far as front/rear comparison is concerned, and next the flow of control skips to pass to the step ST110. On the other hand, if the answer to this decision is YES, so that the current front/rear difference value DV1 is in fact greater than said standard value VT1, then it is considered that front or rear wheel skidding has been established, and next the flow of control passes to the step ST108.

In this step ST108, a front/rear difference flag FFR is set to unity, to indicate such front or rear wheel skidding, and next the flow of control passes to the decision step ST110.

In this decision step ST110, a decision is made as to whether or not the left/right difference value DV2 is greater than a certain determinate standard left/right difference value VT2, or not. If the answer to this decision is NO, so that the current left/right difference value DV2 is less than said standard value VT2, then it is considered that the vehicle is not skidding, at least as far as left/right comparison is concerned, and next the flow of control skips to pass to the step ST114. On the other hand, if the answer to this decision is YES, so that the current left/right difference value DV2 is in fact greater than said standard value VT2, then it is considered that left or right wheel skidding has been established, and next the flow of control passes to the step ST112.

In this step ST112, a left/right difference flag FLR is set to unity, to indicate such left or right wheel skidding, and next the flow of control passes to the step ST114.

In this decision step ST114, a decision is made as to whether or not the value of $\Delta\theta$, the ongoing variation in the throttle opening, is less than a determinate threshold value K1 therefor. If the answer to this decision is YES, so that the variation $\Delta\theta$ of throttle opening is less than said determinate value K1, then next the flow of control passes to the step ST116. On the other hand, if the answer to this decision is NO, so that the variation $\Delta\theta$ of throttle opening is now greater than said determinate value K1, then it is considered that abnormal vehicle throttle operation is occurring, and next the flow of control passes to the step ST118.

In the step ST116, the value of a counter NTH for throttle opening is increased by 1, so as to count the length of time (number of program cycles) that stable throttle opening performance has persisted. On the other hand, in the step ST118, the value of this stable throttle opening counter NTH is reset to zero, so as to indicate that unusual vehicle throttle operating conditions are now occurring. In either case, next, the flow of control passes to the decision step ST120.

In this decision step ST120, a decision is made as to whether or not the count of this stable throttle opening counter NTH, which was started to be counted in the step ST116 of a previous iteration through this skidding control routine, has now become greater than a determinate count value K2 which corresponds to a determinate time period. If the answer to this decision is YES, so that the time period during which stable throttle operation has been occurring has now become greater than a certain time period, then next the flow of control passes to the step ST122. On the other hand, if the answer to this decision is NO, so that the time period during which stable throttle operation has been occurring has not yet become greater than said certain time period, then next the flow of control passes to the step ST124.

In the step ST122, the value of a stable throttle operation flag FIT is set to 1, so as to indicate that, since the determinate time period has elapsed, stable throttle operation has occurred for long enough to determine that vehicle running stability is acceptable. On the other hand, in the step ST124, the value of said stable throttle operation flag FIT is set to 0, since the determinate time period has not yet elapsed and so abnormal throttle operation has not yet definitely not occurred for long enough to determine that vehicle running stability has become acceptable. In either case, next, the flow of control passes to the decision step ST126.

In this decision step ST126, a decision is made as to whether or not the value of AV, the ongoing variation in the vehicle road speed, is less than a determinate threshold value K3 therefor. If the answer to this decision is YES, so that the variation AV of vehicle road speed is less than said determinate value K3, then next the flow of control passes to the step ST128. On the other hand, if the answer to this decision is NO, so that the variation AV of vehicle road speed is now greater than said determinate value K3, then it is considered that abnormal vehicle road speed operation is occurring, and next the flow of control passes to the step ST130.

In the step ST128, the value of a counter NV for vehicle road speed is increased by 1, so as to count the length of time (number of program cycles) that stable vehicle road speed performance has persisted. On the other hand, in the step ST130, the value of this stable vehicle road speed counter NV is reset to zero, so as to indicate that unusual vehicle road speed operating conditions are no longer occurring. In either case, next, the flow of control passes to the decision step ST132.

In this decision step ST132, a decision is made as to whether or not the count of this stable vehicle road speed counter NV, which was started to be counted in the step ST122 of a previous iteration through this skidding control routine, has now become greater than a determinate count value K4 which corresponds to a determinate time period. If the answer to this decision is YES, so that the time period during which stable vehicle road speed operation has been occurring has now become greater than a certain time period, then next the flow of control passes to the step ST134. On the other hand, if the answer to this decision is NO, so that the time period during which stable vehicle road speed operation has been occurring has not yet become greater than said certain time period, then next the flow of control skips to pass to the step ST136.

In the step ST134, the value of an abnormal throttle operation flag FIV is set to 1, so as to indicate that, since the determinate time period has elapsed, stable vehicle road speed operation has occurred for long enough to determine that vehicle running stability is acceptable. On the other hand, in the step ST136, the value of said abnormal throttle operation flag FIV is set to 0, since the determinate time period has not yet elapsed and so stable vehicle road speed operation has not yet occurred for long enough to determine that vehicle running stability has become acceptable. In either case, next, the flow of control passes to the decision step ST138.

In this decision step ST138, a decision is made as to whether or not the value of the flag FIT is currently set to unity. If the answer to this decision is YES, so that currently stable vehicle throttle opening operation is deemed to be occurring, then next the flow of control passes to the decision step ST140. On the other hand, if the answer to this decision is NO, so that currently stable vehicle throttle opening operation is not deemed to be occurring, then next the flow of control skips to pass to the decision step ST146.

In this decision step ST140, a decision is made as to whether or not the value of the flag FIV is currently set to unity. If the answer to this decision is YES, so that currently stable vehicle road speed operation is deemed to be occurring, then next the flow of control passes to the step ST142. On the other hand, if the answer to this decision is NO, so that currently stable vehicle road speed operation is not deemed to be occurring, then next the flow of control skips to pass to the decision step ST146.

In the step ST142, which is thus reached if both stable vehicle throttle opening operation and also stable vehicle road speed operation are considered to be currently occurring, the value of the flag FFR is set to unity. Next, the flow of control passes to the step ST144. And, similarly in this step ST144, the value of the flag FLR is set to zero. Then, the flow of control passes next to the step ST146.

In this decision step ST146, a decision is made as to whether or not the flag FLR is currently set to unity. If the answer to this decision is YES, so that currently left or right wheel skidding is deemed to be occurring, then next the flow of control passes to the step ST148. On the other hand, if the answer to this decision is NO, so that currently left or right wheel skidding is not deemed to be occurring, then next the flow of control passes to the decision step ST150.

In this decision step ST150, a decision is made as to whether or not the flag FFR is currently set to unity. If the answer to this decision is YES, so that currently front or rear wheel skidding is deemed to be occurring, then next the flow of control passes to the step ST148. On the other hand, if the answer to this decision is NO, so that currently front or rear wheel skidding is not deemed to be occurring, then next the flow of control passes to the step ST152.

In the step ST148, which is thus reached if either front/rear or left/right skidding is considered to be currently occurring, the value of a four wheel drive power transfer device 3 control flag FDL is set to unity. The value of this flag FDL is available, via the bus 55, to the program which is being executed by the transmission control device 40, as in the case of the first preferred embodiments described above. Next, the flow of control passes to leave this skidding control routine via the label "NEXT", without doing anything further; and again approximately twenty milliseconds later this skidding control routine is repeated.

On the other hand, in the step ST152, which is thus reached if neither front/rear or left/right skidding is considered to be currently occurring, the value of this four wheel drive power transfer device 3 control flag FDL is set to zero. Again, the value of this flag FDL is available, via the bus 55, to the program which is being executed by the transmission control device 40, as in the case of the first preferred embodiments described above. Thus, as before, the flow of control passes to leave this skidding control routine via the label "NEXT", without doing anything further; and again approximately twenty milliseconds later this skidding control routine is repeated.

THE OPERATION OF THE TRANSMISSION CONTROL DEVICE 40

The portion of the transmission control routine which controls the electric/hydraulic control device 20 for the four wheel drive power transfer device 3, in these second preferred embodiments, is exactly the same as in the first preferred embodiments, and hence will not be particularly described herein.

OVERALL SYSTEM OPERATION

Figure 9:
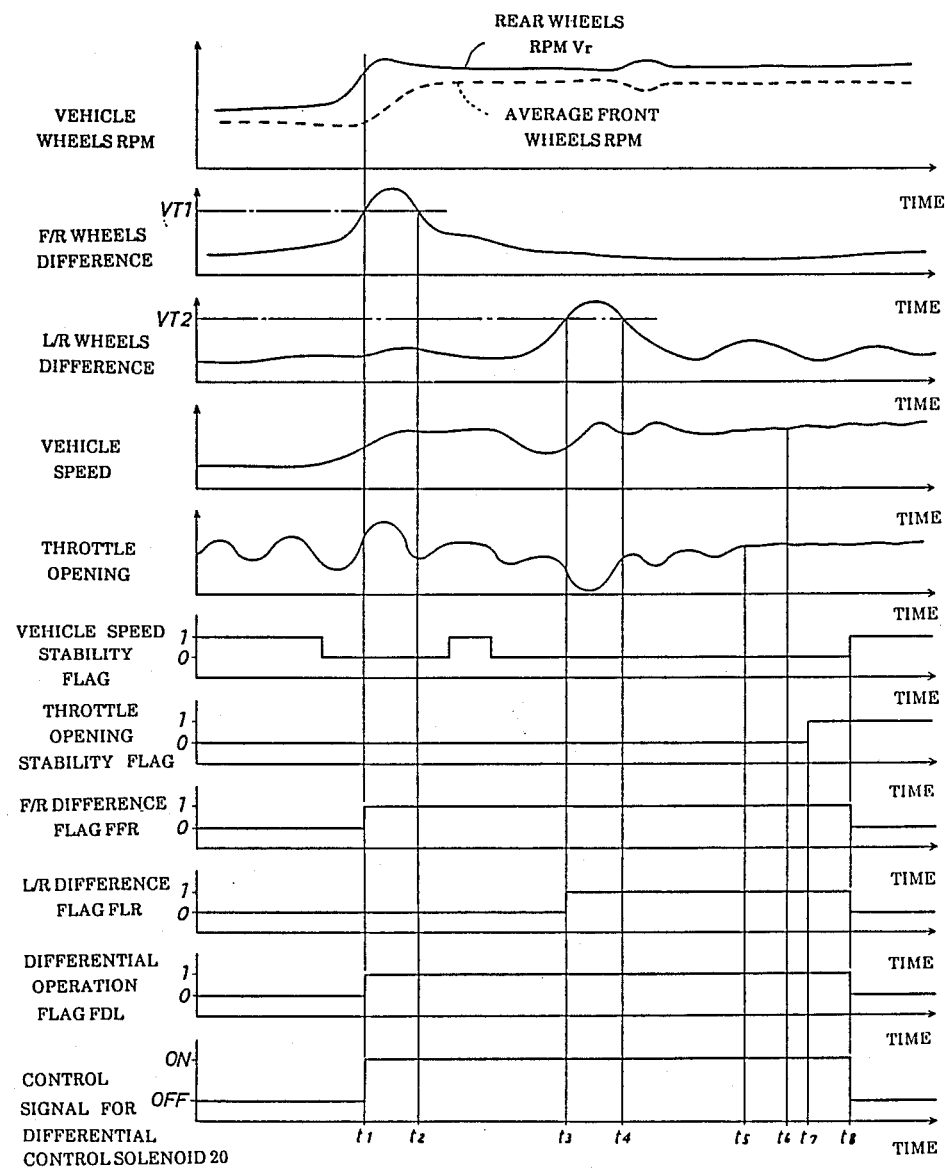
FIG. 9 is a time chart for illustrating an exemplary episode of operation of the skidding control device and the transmission control device of FIG. 3 according to the programs whose flow charts are shown in FIGS. 8 and 5.

FIG. 9 is a time chart for illustrating an exemplary episode of operation of the skidding control device and the transmission control device of FIG. 3 according to the programs whose flow charts are shown in FIGS. 8 and 5. At the time point t1 in this figure, in four wheel drive operation, in this exemplary operational episode, skidding starts of either the front vehicle wheels 28 or the rear vehicle wheels 24, and the front/rear wheels difference value DV1 rises above the threshold value VT1 therefor. Therefore, at the time point t1, the flag FFR is set to 1, and correspondingly the flag FDL is also set to 1. Therefore, at this time point t1, the electric/hydraulic control device 20 for the four wheel drive power transfer device 3 is energized, i.e. is turned ON, so that the clutch 19 of said four wheel drive power transfer device 3 is engaged, after a certain characteristic engagement time therefor, so as to rotationally connect together the sun gear 11 and the ring gear 12 thereof, thus to cause the four wheel drive power transfer device 3 to cease its differential action between the front vehicle wheels 28 and the rear vehicle wheels 24, to thus directly drive said front vehicle wheels 28 and said rear vehicle wheels 24 as an anti skidding measure. Since the differential action between the front vehicle wheels 28 and the rear vehicle wheels 24 has thus been stopped, after the clutch 19 bites, at the time point t2 the front/rear wheels difference value DV1 drops below the threshold value VT1 therefor; however, this does not necessarily mean that the skidding condition has actually terminated, only that it has been controlled.

Further, in this exemplary operational episode, at the time point t3, the skidding starts of either the left or the right front vehicle wheel 28, and the left/right front wheels difference value DV2 rises above the threshold value VT2 therefor. Therefore, at this time point t3, the flag FLR is set to 1, and since the flag FDL is currently set to 1 this value is maintained. And, since the front wheels 28 and the rear wheels 24 are currently continuously directly connected without any differential action being provided between them, DV2 decreases, and at an exemplarily later time point t4, the left/right wheels difference value DV2 drops below the threshold value VT2 therefor; again, however, this does not necessarily mean that the skidding condition has actually terminated.

Next, since differential action is currently being inhibited, the vehicle operational state transits smoothly to normal vehicle running. From the time point t5 (exemplarily), the throttle opening θ becomes substantially constant, and Δθ becomes below K1, so that the counter NTH starts to count up. Finally, at the time point t7, the value of the counter NTH exceeds the value K2, so that the value of the flag FIT becomes set to 1. But, since the value of the flag FIV is zero, still the values of the flags FFR, FLR, and FDL are kept at 1.

However, from the time point t6 (exemplarily), the vehicle speed becomes substantially constant, and thus Δv becomes below K3, so that the counter NV starts to count up. Finally, at the time point t8, the value of the counter NV exceeds the value K4, so that the value of the flag FIV becomes set to 1. Also, at this time point t8, since the value of the flag FIT is likewise one, a decision is now made that the normal vehicle running operational condition has resumed, and the values of the flags FFR, FLR, and FDL are reset to zero. Also, at this time point t8, the electric/hydraulic control device 20 for the four wheel drive power transfer device 3 is deenergized, i.e. is turned OFF, so that (after a certain time period for the operation of the solenoid of the electric/hydraulic control device 20 is allowed for) the clutch 19 of said four wheel drive power transfer device 3 is now disengaged, so as not to rotationally connect together the sun gear 11 and the ring gear 12 thereof, thus now allowing the four wheel drive power transfer device 3 again to provide its differential action between the front vehicle wheels 28 and the rear vehicle wheels 24, to thus drive said front vehicle wheels 28 and said rear vehicle wheels 24 while distributing rotational power and torque between them with differential action, in the normal operational mode.

This action, therefore, means that thereafter, at any time, if either of the flags FFR or FLR becomes set to 1, then the flag FDL will be set to 1, so that the four wheel drive power transfer device 3 will become locked up so that the front wheels 28 and the rear wheels 24 will be directly driven without differential action being provided between them; but, when both of the flags FIV or FIT become set to 1, then the flags FFR, FLR, and FDL will be reset to 0, so that the four wheel drive power transfer device 3 will become unlocked so that the front wheels 28 and the rear wheels 24 will be driven with differential action being provided between them. Thus, the operation is maintained and repeated.

Referring to the schematic illustration of this aspect of the present invention shown in FIG. 7, in this second preferred embodiment: the four wheel drive power transfer device 3 corresponds to the differential means M1; the left front wheel rotational speed sensor 51 and the right front wheel rotational speed sensor 52 and the skid control device 60 together correspond to the front wheels rotation state detecting means M2; and the rear wheels rotational speed sensor 53 and the skid control device 60 together correspond to the rear wheels rotation state detecting means M3. The steps ST102, ST104, ST106, ST108, ST110, and ST112 as executed by the skid control device 60 correspond to the skidding decision means M4. The steps ST146, ST148, ST150, and ST152 as executed by the skid control device 60 and the steps ST205, ST210, and ST215 as executed by the transmission control device 40 correspond to the differential control means M5. The vehicle road speed sensor 30 and the skid control device 60 correspond to the vehicle speed detection means M6. The throttle position sensor 31 and the skid control device 60 correspond to the engine load detection means M7. And the steps ST114, ST116, ST118, ST120, ST122, ST124, ST126, ST128, ST130, ST132, ST134, ST136, ST138, and ST144 as executed by the skid control device 60 correspond to the normal running condition decision means M8.

Thus, in this second preferred embodiment, based upon the output signals from the left front wheel rotational speed sensor 51, the right front wheel rotational speed sensor 52, and the rear wheels rotational speed sensor 53, skidding is determined when the front/rear difference value DV1 exceeds the determinate value VT1 therefor or the left/right difference value DV2 exceeds the determinate value VT2 therefor, and in such a case the differential operation of the four wheel drive power transfer device 3 is stopped, thus putting the transmission system of the vehicle into the direct drive condition as far as distribution of power between the front and the rear wheels thereof is concerned. Timing is started from when skidding is detected, and, when both Δθ has been less than K1 for a determinate time period and also Δv has been less than K3 for a determinate time period, it is judged that normal running conditions have been restored, and then the differential action of the central differential device 8 is restored, thus putting the transmission system of the vehicle into the differential provision condition as far as distribution of power between the front and the rear wheels thereof is concerned. Again, no particular driver action is required for this locking and unlocking control of the central differential device 8, which is performed automatically. Hence, skidding is restricted, and the running stability and the braking stability of the vehicle are enhanced.

Since the decision for stopping the anti skidding control action is made when both Δθ has been less than K1 for a determinate time period and also Δv has been less than K3 for a determinate time period, thus during skidding anti skidding control is continued, while on the other hand when skidding stops anti skidding control is quickly stopped. This keeps vehicle operation with the four wheel drive power transfer device 3 not functioning in its differential mode to a minimum, thus keeping the periods of four wheel drive characteristic type drive distribution as long as possible, reducing the load on the transmission and the vehicle tires, and providing good durability and fuel economy as well as good skidding control and maximized smooth driving experience.

Again, since this skid control method and device utilize the central differential device 8 and the clutch 19 incorporated therein which are already provided to a four wheel drive type transmission, and hence the construction is relatively simple and the provision is economical. Since the decision as to whether or not skidding is occurring is based upon the values DV1 and DV2, whichever of the four vehicle wheels should skid, the starting and stopping of skidding control is possible. Again, this embodiment of the present invention is particularly effective upon a muddy or snow covered road.

While the time periods T1 and T2 are being timed, if skidding is again detected, both of these timings are restarted. This avoids unnecessary operation of the electric/hydraulic control device 20 and of the solenoid incorporated therein, and minimized hunting thereof, thus providing advantages as far as durability of the system and reliability of the electric/hydraulic control device 20 and the clutch 19 are concerned.

Since this skidding control method and device operate by providing direct driving for the front vehicle wheels and for the rear vehicle wheels, if a problem should develop in the braking system for preventing skidding (for example), then nevertheless the anti skidding control can be still carried out.

Again, in the above disclosed preferred embodiment of the present invention there were utilized a transmission control device 40 and a skid control device 60 which were separately provided; but this is not to be considered as limiting, and as before these devices could be implemented as different control program portions for one and the same micro computer. Furthermore, although the above disclosed embodiments of the anti skidding method and device of the present invention do not utilize the existing acceleration skidding (or slipping) control system including the solenoids 29a and 29b at all, nevertheless in other preferred embodiments these two systems could be integrated. In such a manner, the control accuracy of the anti skidding control could be improved, and faster anti skidding control could be made available. And further, in the above disclosed second preferred embodiment of the present invention, the left/right rotational speed difference was only measured for the two front wheels 28 of the vehicle and not for the two rear wheels 24, but this is not to be conceived of as being limitative of the present invention, which would benefit from detecting such rear wheel left/right rotational speed difference, thus improving anti skidding control further.

Thus, according to this method and device, referring to the schematic illustration of this second preferred embodiment of the present invention shown in FIG. 7, when the skidding state is determined by the means M4 according to the outputs of the means M2 and M3, the differential action of the differential device M1 is stopped; and when the means M8 according to the outputs of the means M2 and M7 determines upon a normal vehicle running condition the means M5 causes the differential action of the differential device M1 to be restarted. Thus in the skidding state the differential action between the front and the rear vehicle wheels is eliminated, and this condition is maintained until the decision is made that the vehicle operation is normal, based upon changes in the vehicle speed and changes in the vehicle throttle opening. Thus skidding control is started automatically when it is decided that skidding is occurring, without requiring particular action by the vehicle driver, and said skidding control is likewise terminated automatically.

Although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. For example, although in the shown preferred embodiments there were disclosed applications of the present invention to four wheel drive vehicle configurations in which the engines were mounted in the front engine rooms of their vehicles, alternatively the present invention could be applied to a vehicle with the engine mounted in the rear thereof, i.e. to a rear engined vehicle. In this case, the roles of the front and of the rear propeller shafts should be reversed. Other variations could be envisaged. Accordingly, the scope of the present invention is to be considered as being delimited, not by any particular perhaps entirely fortuitous details of the disclosed preferred embodiment, or of the drawings, but solely by the scope of the accompanying claims, which follow.

What is claimed is:

1. In a four wheel drive power transmission system for a vehicle with left and right front wheels, left and right rear wheels, and an engine, comprising a central power distribution device for transmitting rotational power from said engine to a combination of said left and right front wheels and a combination of said left and right rear wheels with an action of differentiating rotation between said combination of said left and right front wheels and said combination of said left and right rear wheels, and a means for selectively locking up the rotation differentiating action of said central power distribution device so that said central power distribution device transmits the rotational power to said combination of said left and right front wheels and said combination of said left and right rear wheels at a fixed ratio while fixedly connecting said combination of said left and right front wheels with said combination of said left and right rear wheels, a skidding control device comprising:
   a means for detecting rotation of said left front wheel;
   a means for detecting rotation of said right front wheel;
   a means for detecting rotation of said combination of said left and right rear wheels;
   a means for detecting whether or not a difference between the rotation of said left front wheel and the rotation of said right front wheel exceeds a predetermined limit value therefor;
   a means for detecting whether or not a difference between the mean rotation of said left front wheel and said right front wheel and the rotation of said combination of said left and right rear wheels exceeds a predetermined limit value therefor; and
   a means for controlling said rotation differentiating action lock up means so as to lock up the rotation differentiating action of said central power distribution device when at least either the difference between the rotation of said left front wheel and the rotation of said right front wheel or the difference between the mean rotation of said left front wheel and said right front wheel and the rotation of said combination of said left and right rear wheels is detected to exceed said predetermined limit value therefor.

2. A skidding control device according to claim 1, wherein said rotation differentiating action lock up control means continues the locking up of the rotation differentiating action of said power distribution device for a first predetermined period from the time point of the detection that the difference between the rotation of said left front wheel and the rotation of said right front wheel exceeds said predetermined value therefor and for a second predetermined period from the time point of the detection that the difference between the mean rotation of said left front wheel and said right front wheel and the rotation of said combination of said left and right rear wheels exceeds said predetermined limit value therefor.

3. A skidding control device according to claim 1, further comprising a means for detecting road speed of the vehicle, and a means for detecting load on the engine, wherein said rotation differentiating action lock up control means does not lock up the rotation differentiating action of said power distribution device for a first predetermined period as long as a rate of change per time of the road speed of the vehicle is smaller than a predetermined limit value therefor, and for a second predetermined period as long as a rate of change per time of the load on the engine is smaller than a predetermined limit value therefor.

* * * * *